US 6,583,242 B2

(12) United States Patent
Wang et al.

(10) Patent No.: US 6,583,242 B2
(45) Date of Patent: Jun. 24, 2003

(54) SUPPORTED OLEFIN POLYMERIZATION CATALYSTS

(75) Inventors: Shaotian Wang, Mason, OH (US); Norma J. Maraschin, Cincinnati, OH (US); Debra L. Beran, Pearland, TX (US); William J. Sartain, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/921,354

(22) Filed: Aug. 2, 2001

(65) Prior Publication Data

US 2003/0050413 A1 Mar. 13, 2003

(51) Int. Cl.$^7$ .................................................. C08F 4/06
(52) U.S. Cl. ........................ 526/161; 526/172; 526/134; 526/904; 526/943; 526/352; 526/129; 502/104
(58) Field of Search .................................. 526/161, 134, 526/943, 904, 172, 352, 129; 502/104

(56) References Cited

U.S. PATENT DOCUMENTS

| 6,211,311 | B1 | * | 3/2001 | Wang et al. | ................. | 526/131 |
|---|---|---|---|---|---|---|
| 6,232,260 | B1 | * | 5/2001 | Nagy et al. | ................. | 502/155 |
| 6,255,415 | B1 | * | 7/2001 | Wang et al. | ................. | 526/132 |
| 6,376,629 | B2 | * | 4/2002 | Nagy et al. | ................. | 526/161 |
| 2001/0007848 | A1 | * | 7/2001 | Nagy et al. | ................. | 502/155 |
| 2001/0056161 | A1 | * | 12/2001 | Wang et al. | ................. | 526/160 |

* cited by examiner

*Primary Examiner*—David W. Wu
*Assistant Examiner*—Rip A. Lee
(74) *Attorney, Agent, or Firm*—Kevin M. Carroll

(57) ABSTRACT

A supported olefin polymerization catalyst system and a method of making it are disclosed. The catalyst system comprises: (a) a support having mean particle size less than about 30 microns chemically treated with alumoxane; (b) an organometallic complex comprising a Group 3 to 10 transition or lanthanide metal, M, and at least one indenoindolyl ligand that is π-bonded to M; and (c) an activator. Chemical treatment with alumoxane and support mean particle size less than 30 microns are key to making supported indenoindolyl containing catalysts having high activity.

19 Claims, No Drawings

US 6,583,242 B2

SUPPORTED OLEFIN POLYMERIZATION CATALYSTS

FIELD OF THE INVENTION

This invention relates to a supported catalyst for polymerizing olefins and its method of production. The catalyst comprises a support treated with an effective amount of an alumoxane, an organometallic complex containing at least one indenoindolyl ligand, and an optional activator. The support has a mean particle size of less than about 30 microns.

BACKGROUND OF THE INVENTION

Many olefin polymerization catalysts are known, including conventional Ziegler-Natta catalysts. While these catalysts are inexpensive, they exhibit low activity, produce polymers having narrow to medium molecular weight distributions ($M_w/M_n>4$), and are generally poor at incorporating α-olefin comonomers. To improve polymer properties, highly active single-site catalysts, in particular metallocenes, are beginning to replace Ziegler-Natta catalysts. Although more expensive, the new catalysts give polymers with narrow molecular weight distributions, and good comonomer incorporation, which allows easier production of low-density polymers. One disadvantage of metallocene catalysts is that they tend to produce lower molecular weight polymers at higher temperatures.

Recent attention has focused on developing improved single-site catalysts in which a cyclopentadienyl ring ligand is replaced by a heteroatomic ring ligand. These catalysts may be referred to generally as "heterometallocenes." One particular type of heterometallocene of interest contains an indenoindolyl ligand as disclosed in U.S. Pat. No. 6,232,260 and PCT Int. Appl. WO 99/24446.

Single-site catalysts are typically soluble in the polymerization reaction medium and are therefore valuable for solution processes. However, for gas-phase, slurry, and bulk monomer processes, it is useful to immobilize the catalyst on a carrier or support in order to control polymer morphology. Much effort has focussed on supporting metallocene and Ziegler-Natta catalysts. Various supports are taught, particularly inorganic oxides. Support modification techniques, which can improve activity, are also known. For example, supports for Ziegler-Natta catalysts modified with organomagnesiums, organosilanes, and organoboranes are disclosed in U.S. Pat. Nos. 4,508,843, 4,530,913, and 4,565,795. Metallocene catalyst support modification with organosilanes and aluminum, zinc, or silicon compounds is taught in U.S. Pat. Nos. 4,808,561 and 5,801,113. U.S. Pat. No. 6,211,311 teaches support chemical pretreatment for supported single-site catalysts that contain a polymerization-stable heteroatomic ligand.

For catalysts containing indenoindolyl ligands, both U.S. Pat. No. 6,232,260 and PCT Int. Appl. WO 99/24446 disclose that a support such as silica or alumina can be used. However, neither reference contains an example showing supported catalysts and neither patent discloses benefits of specific support particle size.

In sum, new supported indenoindolyl-containing catalysts and methods of making them are needed. Particularly valuable supported catalysts would have improved catalyst activity.

SUMMARY OF THE INVENTION

The invention is a supported catalyst system and a method of making it. The catalyst system comprises an alumoxane treated support, an organometallic complex that contains at least one indenoindolyl ligand, and an activator. The support has a mean particle size of less than about 30 microns.

We surprisingly found that the particle size and alumoxane modification are key to making superior supported indenoindolyl catalysts for olefin polymerization. In particular, catalysts of the invention are more active in olefin polymerization than comparable catalysts having higher particle size support or for which the support is not modified by alumoxane.

DETAILED DESCRIPTION OF THE INVENTION

Supported catalyst systems of the invention include an indenoindolyl-containing complex, an activator, and a support that has been chemically pretreated with an alumoxane.

The supported catalyst systems of the invention contain an organometallic complex comprising a Group 3 to 10 transition or lanthanide metal, M, and at least one indenoindolyl ligand that is π-bonded to M. The metal, M, may be any Group 3 to 10 transition or lanthanide metal. Preferably, the catalyst contains a Group 4 to 6 transition metal; more preferably, the catalyst contains a Group 4 metal such as titanium or zirconium.

The organometallic complex of the invention also contains at least one indenoindolyl ligand that is π-bonded to M. Indenoindolyl ligands are well-known in the art and are taught in U.S. Pat. No. 6,232,260, the teachings of which are incorporated herein by reference. The indenoindolyl ligand is an anionic ligand derived from an indenoindole. An indenoindole is an organic compound that has both indole and indene rings. The five-membered rings from each are fused, i.e., they share two or more carbon atoms. Any of the indenoindolyl ring atoms can be unsubstituted or substituted with one or more groups such as alkyl, aryl, aralkyl, halogen, silyl, nitro, dialkylamino, diarylamino, alkoxy, aryloxy, thioether, or the like. Additional rings can be present, as long as an indenoindole moiety is present.

Suitable indenoindole ligand precursors include, for example, 5,10-dihydroindeno[3,2-b]indole, 4,8,10-trimethyl-5H-indeno[3,2-b]indole, 4-tert-butyl-8-methyl-5,10-dihydroindeno[3,2-b]indole, 4,8-dichloro-5,10-dihydroindeno[3,2-b]indole, 10-methylbenzo[f]-5H-indeno[3,2-b]indole, benzo[g]-5,10-dihydroindeno[3,2-b]indole, 5,10-dihydroindeno[3,2-b]benzo[e]indole, benzo[g]-5,10-dihydroindeno[3,2-b]benzo[e]indole, and the like.

The indenoindolyl ligand is generated by deprotonating a ligand precursor with a base to give an anionic ring system with a high degree of aromaticity (highly delocalized). Reaction of the anion with, e.g., a transition metal halide gives the desired organometallic complex. The indenoindolyl ligand is π-bonded to M in the complex.

The organometallic complex optionally includes one or more additional polymerization-stable, anionic ligands. Examples include substituted and unsubstituted cyclopentadienyl, fluorenyl, and indenyl, or the like, such as those described in U.S. Pat. Nos. 4,791,180 and 4,752,597, the teachings of which are incorporated herein by reference. Suitable ligands also include substituted and unsubstituted boraaryl, pyrrolyl, indolyl, quinolinyl, pyridinyl, and azaborolinyl as described in U.S. Pat. Nos. 5,554,775, 5,539,124, 5,637,660, and 5,902,866, the teachings of which are also incorporated herein by reference. The organometallic complex also usually includes one or more labile ligands such as halides, alkoxys, siloxys, alkyls, alkaryls, aryls, dialkylaminos, or the like. Particularly preferred are halides, alkyls, and alkaryls (e.g., chloride, methyl, benzyl).

The indenoindolyl and/or polymerization-stable ligands can be bridged. Groups that can be used to bridge the ligands include, for example, methylene, ethylene, 1,2-phenylene, dialkylsilyls, and diarylsilyls. Normally, only a single bridge is included, but complexes with two bridging groups can be used. Bridging the ligand changes the geometry around the transition metal and can improve catalyst activity and other properties, such as molecular weight, comonomer incorporation, and thermal stability.

Suitable activators include alumoxanes. Preferred alumoxanes are polymeric aluminum compounds represented by the cyclic formula $(R^1—Al—O)_s$ or the linear formula $R^1(R^1—Al—O)_sAlR^1$ wherein $R^1$ is a $C_1$–$C_5$ alkyl group and s is an integer from 1 to about 20. Preferably, $R^1$ is methyl and s is from about 4 to about 10. Exemplary alumoxane activators are (poly)methylalumoxane (MAO), ethylalumoxane, and diisobutylalumoxane. Optionally, the activator is a trialkyl or triaryl aluminum compound, which preferably has the formula $AlR^2_3$ where $R^2$ denotes a $C_1$–$C_{20}$ hydrocarbyl.

Suitable activators also include substituted or unsubstituted trialkyl or triaryl boron derivatives, such as tris(perfluorophenyl)boron, and ionic borates such as tri(n-butyl)ammonium tetrakis(pentafluorophenyl)boron or trityl tetrakis(pentafluorophenyl)boron. The ionic borates ionize the neutral organometallic compound to produce an active catalyst for olefin polymerization. See, for instance, U.S. Pat. Nos. 5,153,157, 5,198,401, and 5,241,025, all of which are incorporated herein by reference. Suitable activators may be combined or used separately.

The molar ratio of the metal of the activator component to the transition metal of the single-site catalyst is preferably in the range of about 0.3:1 to 1000:1, more preferably from about 20:1 to 800:1, and most preferably from about 30:1 to 500:1. Where the activator is an ionic borate, the molar ratio of the metal of the activator component to the transition metal of the single-site catalyst is preferably in the range of about 0.3:1 to 8:1.

The organometallic complex is immobilized on a support, which is preferably a porous material. The support can be inorganic oxides, inorganic chlorides, and organic polymer resins, or mixtures thereof. Preferred inorganic oxides include oxides of Group 2, 3, 4, 5, 13, or 14 elements. Preferred inorganic chlorides include chlorides of the Group 2 elements. Preferred organic polymer resins include polystyrene, styrene-divinylbenzene copolymers, and polybenzimidizole. Particularly preferred supports include silica, alumina, silica-aluminas, magnesias, titania, zirconia, magnesium chloride, and polystyrene. Silica is most preferred.

The support has a mean particle size of less than about 30 microns ($\mu$m). Preferably, the support has a mean particle size of less than about 25 microns ($\mu$m); and most preferably, less than about 20 microns ($\mu$m). Preferably, the support has a surface area in the range of about 10 to about 1000 m$^2$/g, more preferably from about 50 to about 700 m$^2$/g, and most preferably from about 100 to about 500 m$^2$/g. Preferably, the pore volume of the support is in the range of about 0.1 to about 4.0 mL/g, more preferably from about 0.5 to about 3.5 mL/g, and most preferably from about 0.8 to about 3.0 mL/g. The average pore diameter is typically in the range of about 10 to about 1000 Å, preferably about 20 to about 500 Å, and most preferably about 50 to about 350 Å.

The organometallic complex is supported using any of a variety of immobilization techniques. In one method, the organometallic complex is dissolved in a solvent and combined with the support. Evaporation of the solvent gives a supported catalyst. An incipient wetness method can also be used. The activator can also be deposited on the support or it can be introduced into the reactor separately from the catalyst.

Before the support is combined with the organometallic complex, it is chemically modified by treatment with an alumoxane modifier. Suitable alumoxanes include polymeric aluminum compounds represented by the cyclic formula $(R^3—Al—O)_s$ or the linear formula $R^3(R^3—Al—O)_sAlR^3$ wherein $R^3$ is a $C_1$–$C_5$ alkyl group and s is an integer from 1 to about 20. Preferably, $R^3$ is methyl and s is from about 4 to about 10. Exemplary alumoxane modifiers are (poly)methylalumoxane (MAO), ethylalumoxane, and diisobutylalumoxane.

The alumoxane modifier is added to the support in an amount preferably in the range of about 0.1 to 20 mmoles of aluminum (contained in the modifier) per gram of support, more preferably from about 0.2 to 10 mmoles/gram, and most preferably from about 0.5 to 5 mmoles/gram. Treatment with alumoxane is typically performed in the liquid phase, and the alumoxane modifier is applied to the support as a liquid, either by itself or as a solution in a suitable solvent such as a hydrocarbon. An incipient wetness method may be used for support pre-treatment with alumoxane.

The support is preferably heated at a temperature from about 50° C. to about 1000° C., more preferably from about 100° C. to about 800° C., before and/or after the alumoxane modification. After alumoxane modification, the support is most preferably dried in vacuum at a temperature from about 20° C. to about 50° C.

The catalyst is particularly valuable for polymerizing olefins, preferably α-olefins. Suitable olefins include, for example, propylene, 1-butene, 1-hexene, 1-octene, ethylene and the like, and mixtures thereof. The catalyst is valuable for copolymerizing ethylene with α-olefins or di-olefins (e.g., 1,3-butadiene, 1,4-hexadiene, 1,5-hexadiene).

The catalysts can be used in a variety of polymerization processes. They can be used in a liquid phase (slurry, solution, suspension, bulk), high-pressure fluid phase, or gas phase polymerization processes, or a combination of these. The pressure in the polymerization reaction zones typically ranges from about 15 psia to about 30,000 psia, and the temperature usually ranges from about –100° C. to about 300° C.

Catalysts of the invention are highly productive. Typical activities range from 9,500 to 11,000 grams polymer per gram catalyst per hour, or higher (see Table 1). Surprisingly, the use of silica having a mean particle size less than about 30 microns leads to increased catalyst activity compared to higher particle size silicas (see Table 1). More surprisingly, the use of smaller particle size silicas leads to improved bulk density (see Table 1).

The following examples merely illustrate the invention. Those skilled in the art will recognize many variations that are within the spirit of the invention and scope of the claims.

EXAMPLE 1

Preparation of Supported Catalyst System

Organometallic Complex Preparation

This following describes the synthesis of (cyclopentadienyl)(3,10-dimethylindeno[3,2-b]indolyl) zirconium dichloride, which has the structural formula:

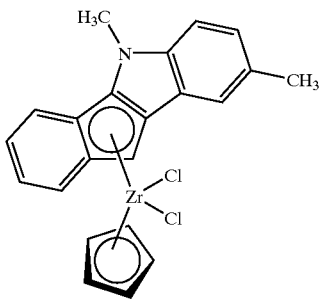

3,10-Dimethyl-5H-indeno[3,2-b]indole is prepared according to the procedure disclosed in U.S. Pat. No. 6,232,260. A 500-mL flask equipped with a stir bar is charged with 3,10-dimethyl-5H-indeno[3,2-b]indole (14.22 g, 60.94 mmol) and dissolved in toluene (175 mL). N-butyl lithium (38 mL, 2.5 M in hexanes, 95.0 mmol) is then added by dropping funnel to the flask under vigorous stirring at room temperature. The reaction mixture is stirred overnight, then the solid precipitate is filtered, and washed with toluene (100 mL) followed by heptane (200 mL). The resulting anionic complex (10.0 g, 42 mmol) and toluene (95 mL) are then added to a 250 mL flask equipped with a stir bar, followed by addition of diethyl ether (35 mL). The anionic complex solution is then added over 15 minutes to a slurry of (cyclopentadienyl)ZrCl$_3$ (11.1 g, 42.0 mmol) in toluene (190 mL) and diethyl ether (190 mL) under vigorous stirring. The mixture is stirred overnight at room temperature, filtered, and the solid product is washed with toluene (200 mL) and dried under vacuum. 16.5 g (77.8% yield) of (cyclopentadienyl)(3,10-dimethylindeno[3,2-b]indolyl) zirconium dichloride is formed.

Supported Catalyst Preparation

Catalyst 1A: Silica (Crosfield ES747JR, mean particle size=20 μm, 16 g) is calcined at 250° C. for 12 hours before cooling to room temperature. In an inert atmosphere glovebox, MAO (4 mL of 30 weight percent MAO in toluene solution) is slowly added to 5 grams of the calcined silica while stirring. After addition of MAO, the mixture is stirred for an additional one hour. The MAO treated silica is then dried in vacuum (about 28.5 inches mercury) at room temperature for about 1.5 hours. MAO-treated silica (6.25 g) is obtained.

A mixture of MAO (6 mL of 30 weight percent MAO in toluene solution) and (cyclopentadienyl)(3,10-dimethylindeno[3,2-b]indolyl) zirconium dichloride organometallic complex (0.258 grams, 0.561 mmoles Zr) is then added slowly to the vacuum dried MAO-treated silica while stirring. After addition of the MAO-organometallic complex mixture, the silica is stirred for an additional one hour. The supported catalyst (12.44 grams containing about 32.7% toluene) is a free-flowing powder that can be used directly or vacuum dried before use. For these catalyst preparations, the supported catalysts are all vacuum dried at room temperature for 3 hours.

Catalyst 1B: The catalyst is prepared according to the procedure of Catalyst 1A, except that Crosfield ES757 silica is used (mean particle size=25 μm).

Comparative Catalyst 1C: The catalyst is prepared according to the procedure of Catalyst 1A, except that Davison 955 silica is used (mean particle size=40 μm).

Comparative Catalyst 1D: The catalyst is prepared according to the procedure of Catalyst 1A, except that Davison 948 silica is used (mean particle size=54 μm).

Comparative Catalyst 1E: The catalyst is prepared using Crosfield ES757 silica (mean particle size=25 μm) that is not pre-treated with MAO before addition of the organometallic complex. In an inert atmosphere glovebox, a mixture of MAO (10 mL of 30 wt. % MAO in toluene solution) and (cyclopentadienyl)(3,10-dimethylindeno[3,2-b]indolyl) zirconium dichloride organometallic complex (0.258 grams, 0.561 mmoles Zr) is added slowly to 5 g of calcined Crosfield ES757 silica while stirring. After addition of the MAO-organometallic complex mixture, the whole mixture is stirred for one hour. The supported catalyst is then dried at room temperature under vacuum for 3 hours.

EXAMPLE 2

Polymerization Runs

Polymerizations are performed in a one-liter, stainless-steel autoclave. 1-Hexene (100 mL) is introduced into the reactor. Triisobutylaluminum (0.08 mmoles; 0.4 mL of 0.2 M solution in heptane) and Armostat 710 (4 mg in 1.0 mL heptane) are added to the reactor with isobutane (about 500 mL). Ethylene is added to the reactor (to equilibrate at 320 psig), and the temperature is allowed to equilibrate to 80° C. The supported catalyst (0.034 grams), pre-loaded in a side-arm injector, is then injected into the reactor with isobutane (100 mL). The polymerization is conducted for approximately 0.5 h. See Table 1 for results.

Catalysts 1A and 1B and Comparison Catalysts 1C and 1D are each run under the polymerization conditions outlined above. Catalysts 1A and 1B, prepared with the lower particle size silica, have significantly higher activities and increased bulk densities, compared to either Comparison Catalysts 1C or 1D. Pre-treatment of silica with MAO also significantly improves catalyst activity as seen from the difference between Catalyst 1B and Comparative Catalyst 1E.

TABLE 1

Effect of Silica Particle Size on Catalyst Activity

| Catalyst ID | Silica Mean Particle Size (μm) | Bulk Density (lb/ft$^3$) | Activity (g/g cat/hr) |
|---|---|---|---|
| 1A | 20 | 27.8 | 10,448 |
| 1B | 25 | 27.6 | 9,720 |
| 1C* | 40 | 27.2 | 8,750 |
| 1D* | 54 | 25.8 | 7,570 |
| 1E* | 25 | 27.3 | 7,760 |

*Comparative example

We claim:

1. A catalyst system which comprises:
   (a) a support having mean particle size less than about 30 microns, wherein the support is chemically treated with alumoxane by adding the alumoxane to the support in an amount in the range of about 0.1 to 20 mmoles of aluminum contained in the alumoxane per gram of support;
   (b) an organometallic complex comprising a Group 3 to 10 transition or lanthanide metal, M, and at least one indenoindolyl ligand that is π-bonded to M; and
   (c) an activator.

2. The catalyst system of claim 1 wherein the support has a mean particle size of less than about 25 microns.

3. The catalyst system of claim 1 wherein the support is selected from the group consisting of silicas, aluminas, silica-aluminas, titanias, zirconias, magnesias, magnesium chloride, polystyrene, and mixtures thereof.

4. The catalyst system of claim 1 wherein the support is silica.

5. The catalyst system of claim 1 wherein the support is heated at a temperature within the range of about 50° C. to about 1000° C. before or after the chemical treatment.

6. The catalyst system of claim 1 wherein the support is dried in vacuum at a temperature within the range of about 20° C. to about 50° C. after the chemical treatment.

7. The catalyst system of claim 1 wherein M is a Group 4-6 transition metal.

8. The catalyst system of claim 1 wherein M is a Group 4 transition metal.

9. The catalyst system of claim 1 wherein the activator is selected from the group consisting of alumoxanes, neutral boron compounds, and ionic borates.

10. A method which comprises:
  (a) treating a support, having mean particle size less than about 30 microns, with an effective amount of alumoxane; and
  (b) combining the treated support with an organometallic complex comprising a Group 3 to 10 transition or lanthanide metal, M, and at least one indenoindolyl ligand that is π-bonded to M, and optionally with an activator, to produce a supported catalyst.

11. The method of claim 10 wherein the support is selected from the group consisting of silicas, aluminas, silica-aluminas, titanias, zirconias, magnesias, magnesium chloride, polystyrene, and mixtures thereof.

12. The method of claim 10 wherein the support is silica.

13. The method of claim 10 wherein the support is heated at a temperature within the range of about 50° C. to about 1000° C. prior to treatment with alumoxane.

14. The method of claim 10 wherein the treated support from step (a) is heated at a temperature within the range of about 50° C. to about 1000° C. prior to combining it with the organometallic complex.

15. The method of claim 10 wherein the treated support from step (a) is dried in vacuum at a temperature within the range of about 20° C. to about 50° C. prior to combining it with the organometallic complex.

16. The method of claim 10 wherein M is a Group 4-6 transition metal.

17. The method of claim 10 wherein M is a Group 4 transition metal.

18. A process which comprises polymerizing an olefin in the presence of the catalyst system of claim 1.

19. A process which comprises copolymerizing ethylene with a $C_3$–$C_{10}$ α-olefin in the presence of the catalyst system of claim 1.

* * * * *